United States Patent [19]

McCraw

[11] Patent Number: 4,977,646
[45] Date of Patent: Dec. 18, 1990

[54] CAM ASSISTED LOAD BINDER

[75] Inventor: Clarence L. McCraw, East Ridge, Tenn.

[73] Assignee: Columbus McKinnon Corporation, Amherst, N.Y.

[21] Appl. No.: 472,274

[22] Filed: Jan. 30, 1990

[51] Int. Cl.$^5$ ............................................... B66F 3/00
[52] U.S. Cl. ................................. 24/68 CD; 24/68 CT
[58] Field of Search ............ 24/68 CD, 68 CT, 68 R, 24/71.2, 69 R, 69 TT, 69 CT, 69 ST; 294/75; 254/218

[56] References Cited

U.S. PATENT DOCUMENTS

| D. 252,555 | 8/1979 | Schreyer | D8/355 |
|---|---|---|---|
| 1,911,194 | 5/1933 | Jenkins et al. | 24/68 CT |
| 2,458,375 | 1/1949 | Haubert | 24/68 CT |
| 3,726,507 | 4/1973 | Rymaza | 254/78 |
| 4,058,291 | 11/1977 | Schreyer et al. | 254/74 |
| 4,069,902 | 1/1978 | Zdeb | 192/43 |
| 4,130,269 | 12/1978 | Schreyer | 254/67 |
| 4,168,668 | 9/1979 | Grube et al. | 105/477 |
| 4,198,174 | 4/1980 | Borowiec et al. | 403/44 |
| 4,229,131 | 10/1980 | Hague | 410/12 |
| 4,314,783 | 2/1982 | Parnell et al. | 410/34 |
| 4,366,607 | 1/1983 | MacCuaig | 24/270 |
| 4,382,734 | 5/1983 | Synowiec et al. | 410/70 |
| 4,382,735 | 5/1983 | Synowiec | 410/70 |
| 4,422,218 | 12/1983 | Brasseux | 24/68 |
| 4,693,097 | 9/1987 | Rivera | 70/18 |
| 4,800,627 | 1/1989 | Smith | 24/68 CD |

FOREIGN PATENT DOCUMENTS

| 946137 | 4/1974 | Canada | 24/68 CD |
|---|---|---|---|
| 789992 | 1/1958 | United Kingdom | 24/68 CT |

Primary Examiner—Victor N. Sakran
Attorney, Agent, or Firm—Bean, Kauffman & Spencer

[57] ABSTRACT

An over center load binder assembly is disclosed comprising a crank member, a clevis type draw bar with leg elements pivotally connected to a first portion of the crank member, a pull link pivotally connected to a second portion of the crank member and a lever handle, pivotally connected to the crank member and comprising a cam surface, radial to the axis of the lever handle pivotal connection, having a maximum lobe swell sufficient to displace the pull link from an alignment between the leg portions of the clevis type draw bar to release the assembly from tension.

19 Claims, 2 Drawing Sheets

CAM ASSISTED LOAD BINDER

BACKGROUND AND OBJECTS OF THE INVENTION

This invention relates to load binders and more particularly to the so-called over center, lever operated type of load binder. Such devices are used to tension chains or cables or the like such as used, for example, in tying down and securing large loads on flat bed trucks. Prior art examples of typical load binders are disclosed in U.S. Pat. Nos. 396,714; 1,518,769; 1,972,346; 2,539,997; 3,826,469; 4,122,587 and 4,422,218. Load binding devices are typically operated by manual pivoting of a handle which acts as a lever to provide the operator with a mechanical advantage when drawing the ends of the binder toward one another. The tension is maintained by moving the lever into an over center locked position behind a lever pivot point.

The load binding device is typically released by manual rotation of the lever in the direction opposite tensioning. A serious problem can be encountered by operators when releasing over center load binders of the prior art, because when the lever passes from an over center locked position, through a dead center position the tension on the chain (or cable) exerts a sudden increased force which can cause the handle to "fly back". In many cases, particularly when the bound load has shifted during transit, the tension on the chain may be so substantially increased by the shifting of the load that the "fly back" problem is further exacerbated.

Thus, the operator may be exposed to the danger of a flaying lever over which he may lose control. Furthermore, since it is not unknown for an operator to inappropriately use a section of pipe to extend the length of the lever arm of the load binder to achieve increased leverage for releasing a bound load that has shifted into extremely high tension arrangement, the danger of a flaying lever becomes multiplied.

U.S. Pat. No. 4,366,607 discloses an over center type load binder which provides a degree of lost motion such that the crank mechanism can overrun the operating lever on passing the dead center position. Such device can be effective in avoiding the fly back problem, but unless the handle is removed or tied down, it can swing dangerously about as the vehicle carrying the load bumps along a typical roadway and may, under some conditions, jar the crank mechanism to accidental release.

It is an object of the present invention to provide an improved load binder of the over center type which will enable the operator to provide leveraged tensioning forces on a chain system or the like and to lock the binder in tensioned condition. Another object is to provide a load binder having resistance to handle swing during roadway travel and improved ease of tension release with decreased danger of handle fly back problems. Still another object is to provide a load binder embodying the features of the invention which is of simple construction, inexpensively manufactured, rugged and maintenance free.

BRIEF SUMMARY OF THE INVENTION

The present invention features a novel cam surface which is incorporated in the operating profile of the lever of the load binder. The novel cam surface functions automatically, while the binder is in the tensioned position, to assist in locking the binder and tensioning the handle to resist roadway induced swing. During the binder release operation, the cam surface functions to neutralize portions of the tension forces previously stored in the load binding system, which forces in the case of various prior art load binders can be transmitted to the levering handle and cause it to "whip" out of the control of the user. The novel cam surface also operates to ease the manual application of greater than normal forces which may be required to release the binding system caused by load shifting, as will be illustrated and described in detail hereinafter.

DETAILED DESCRIPTION

Figure 2:
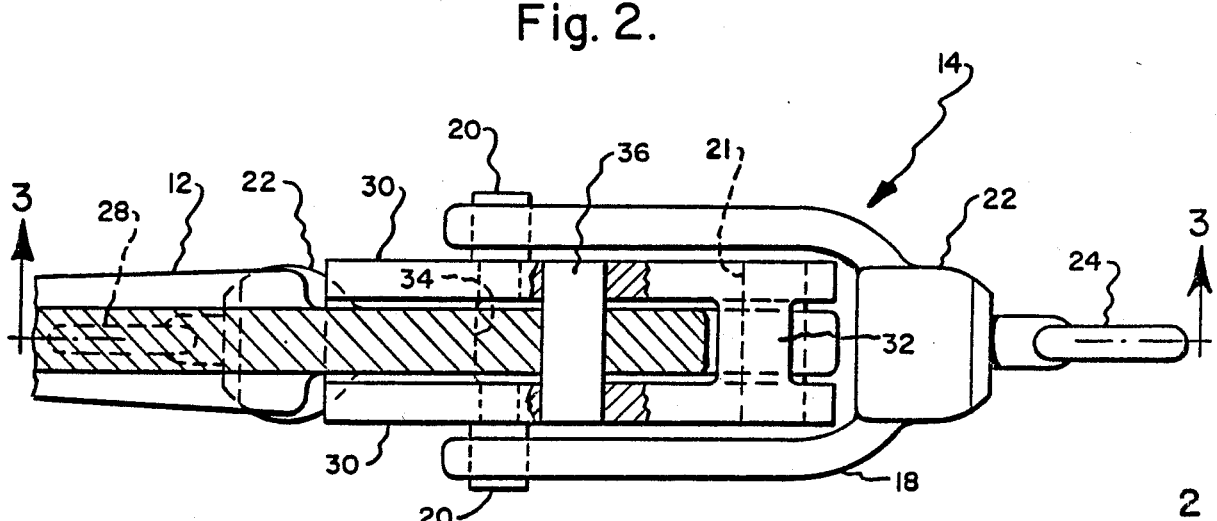
FIG. 2 is a horizontal, sectional view taken along line 2—2 of FIG. 1.
Figure 1:
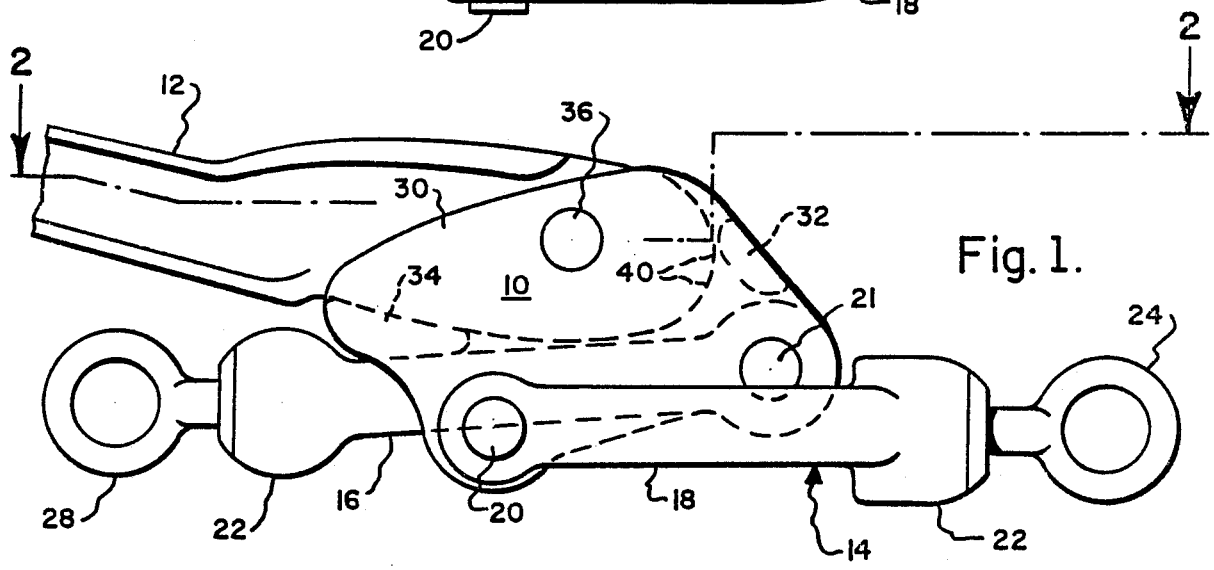
FIG. 1 is a side elevational view of a load binder of the invention, showing fragmentally the lever operating handle component thereof when the binder is in a locking condition.
Figure 3:
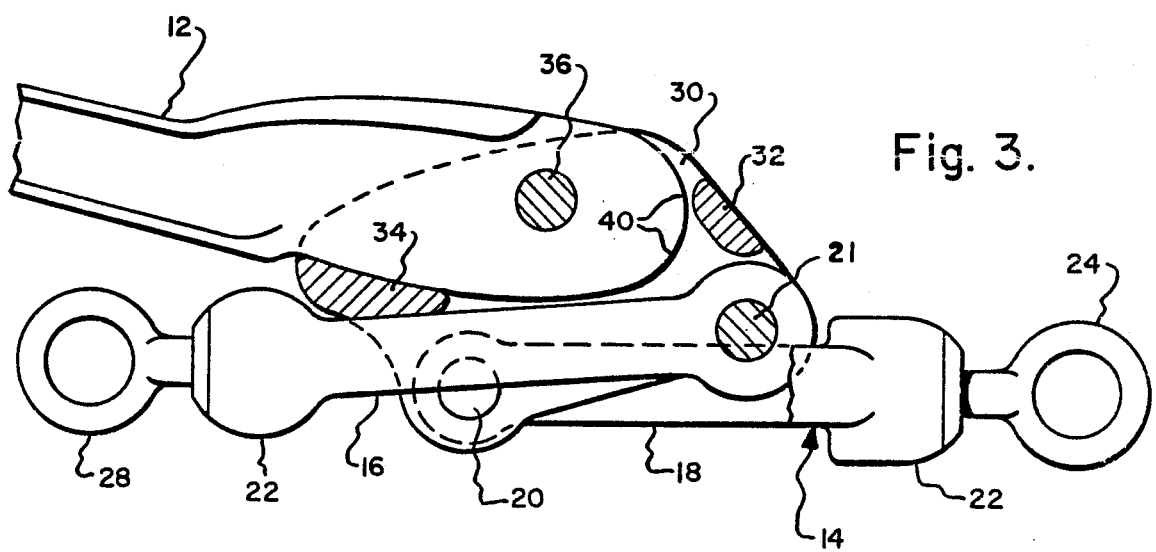
FIG. 3 is a vertical, sectional view showing the relationship of operating parts of the load binder of FIG. 1 when in a locking position.
Figure 7:
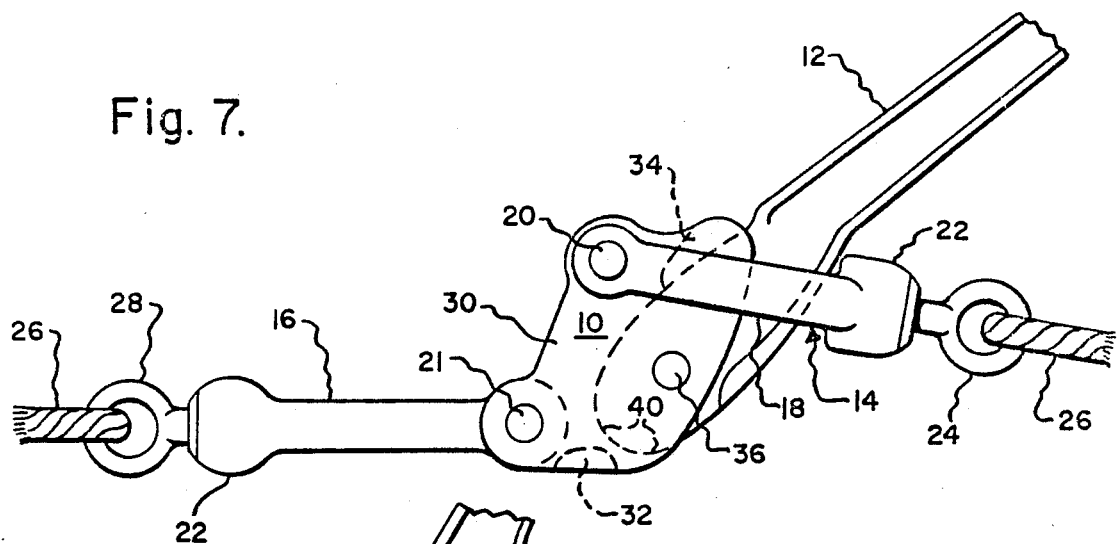
FIG. 7 is a side elevational view illustrating the load binder of FIG. 1, at its fully released condition.

The figures illustrate a load binder of the present invention including a crank member 10, a lever type handle member 12, a clevis type draw bar 14, and a pull link 16. The draw bar 14 includes two leg elements 18,18 which are apertured at their ends to receive pivot pins 20,20. At its other end, draw bar 14 typically terminates in a ball and socket formation 22 from which extends an eyelet 24 for coupling to a chain or cable as shown at 26. The chain or cable in turn, will typically carry a hook (not shown) or the like at its other end for coupling to the bed of the vehicle carrying the load.

Pull link 16 is formed at a first end with an aperture to receive pivot pin 21 and is typically formed at its other end, similarly to draw bar 14, with a ball and socket portion 22 from which extends an eyelet 28 for coupling with a chain or cable, which in turn will typically carry a hook (not shown) at its other end for coupling to the vehicle frame at the opposite side of the load. At least a portion of the pull link is dimensioned to fit between the leg elements of the draw bar.

The crank member 10 typically comprises a pair of parallel spaced apart side panel elements 30,30 which are structurally connected by bridge elements 32 and 34 at opposite ends thereof. The side panels 30,30 are typically apertured in alignment to receive opposite ends of pivot pins 36 and 21, which pivotally interconnect crank member 10 to the operating lever handle 12 and pull link 16 respectively. Pivot pins 20, 20 may be formed in alignment on side panels 30,30 but typically are welded, compression fitted or otherwise connected to said side panels through aligned apertures therein. Alternately, pivot pins 20,20 may be welded, compression fitted or otherwise attached to the leg elements of draw bar 14, extending through aligned apertures in the crank. It is also to be noted that bridge element 34 of crank member 10 also acts as a leverage point in tensioning, a stop or lock when the binder is in the fully locked position and can limit unnecessary further movements of the lever handle relative to the assembly when the device is in fully locked and opened conditions. Bridge element 32 can also act, together with or without the upper surface of pull link 16, against the cam surface of the lever to tension the handle from flaying while the load binder is in the locked position.

Figure 6:
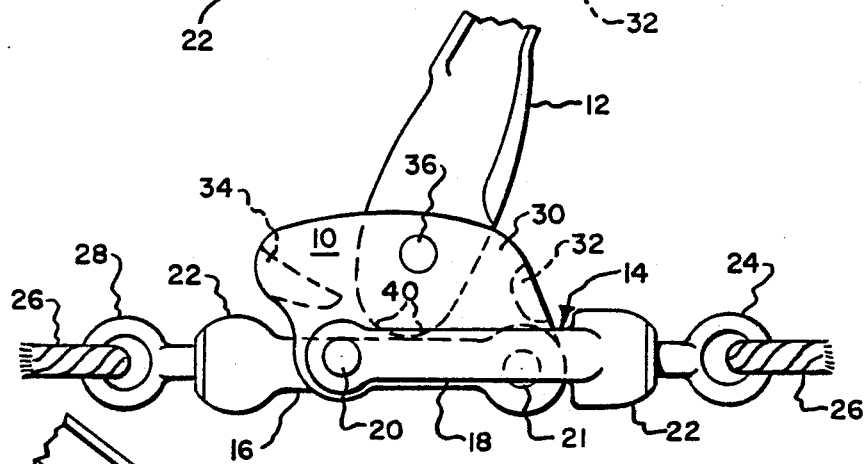
FIG. 6 is a side elevational view illustrating the load binder of FIG. 1, when the load releasing condition has progressed past dead center.
Figure 5:
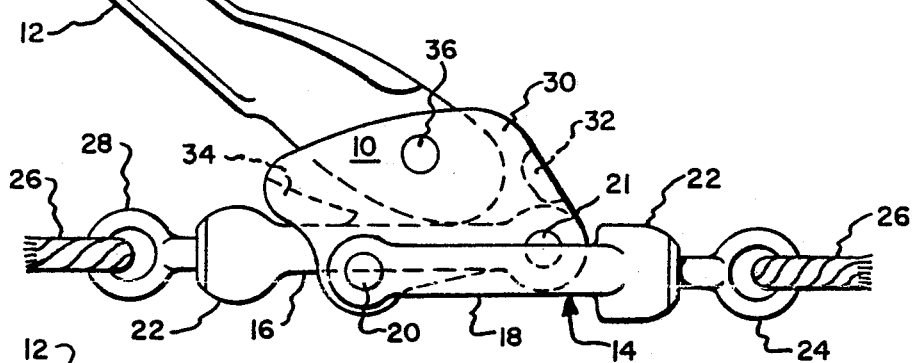
FIG. 5 is a side elevational view illustrating the load binder of FIG. 1, when a load releasing condition has been initiated.
Figure 4:
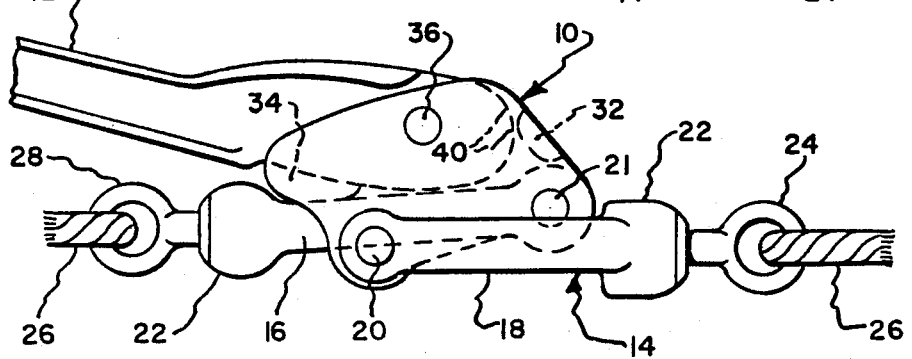
FIG. 4 is a side elevational view illustrating the load binder of FIG. 1, when it is in load locking tensioned condition.

It is a special feature of the present invention that the lever handle 12 is formed at its pivoting end with a camshaped profile; the region of the cam lobe maximum swell being designated by the numeral 40 on the drawing herewith. This maximum swell area of the cam is so located relative to the center line of the lever 12 radial extension away from the center line of the pivot pin 36 that it progressively bears against the upper surface of pull link 16 as the lever is pulled through the positions shown at FIGS. 5 and 6, at which time the pull link is progressively moved from an over "dead center" condition relative to the assembly through and past a dead center condition. As the assembly moves past the dead center condition the tension applied by the cables (or chains) coupled to eyelets 24 and 28 operates to rotate the crank member into an unlocked condition with the handle "stopped" against socket portion 22 of draw bar 14 in an oblique angle to the tension plane. Generally it is preferred that the maximum swell area of the cam surface be positioned so that the lever handle displaces said pull link from alignment between said leg portions of said clevis type draw bar sufficient to release said load binder when the lever handle progresses to an angle greater than about 60 degrees from the tension plane and most preferable to an angle greater than about 80 degrees.

When the operator pulls upon the handle 12 to cause it to progressively swing to the right as shown in FIGS. 4–7, the tension created by the upper surface of link 16 bearing against the cam portion 40 as it moves in relation therewith over the "dead center" condition of the assembly, counters the tendencies of the tension applied by the cable to cause the handle 12 to whip forwardly in an arc toward the right. In consequence, the tension energy heretofore stored in the cable system is usefully employed by the binder assembly itself, and the operator needs only to apply relatively light controlling forces to the handle 12 in order to cause it to move the assembly over its "dead center" condition. Thus, the operator confronts no undesirable "handle whipping" problems, and is able to safely perform load releasing operations by use of minimum physical efforts.

It is to be understood of course that the benefits of this invention are available not only as applied to the specific structural design of the puller as heretofore described and illustrated herein, but may be embodied in any other "over center" lever operated type design of a load binder. For example, in lieu of the ball and socket 22 and eyelet 24,28 arrangements for coupling the binder to chains or cables or the like, any other suitable arrangement may be employed inasmuch as it is only an accessory to and not relevant to the present invention. Furthermore, the relative dimensioning and shaping of the components of the binder assembly may be varied in accordance with specific performance requirements, as long as the essence of the present invention is retained.

I claim:

1. An over center load binder assembly comprising a crank member, a clevis type draw bar with leg elements pivotally connected to a first portion of said crank member, a pull link pivotally connected to a second portion of said crank member and dimensioned to at least in part fit between leg portions of said clevis type draw bar, and a lever handle pivotally connected to said crank member for movement about an axis between said first and second portions, said level handle includes a cam surface, facing radially outwardly of said axis and having a maximum lobe swell sufficient to contact a surface of said pull link and displace said pull link from an alignment between said leg portions of said clevis type draw bar to release said load binder.

2. The load binder assembly of claim 1 wherein said lever handle is pivotally connected to said crank member on an axis displaced from a centerline between pivotal connections of said crank first and second portions.

3. The load binder assembly of claim 1 wherein said maximum lobe swell is sufficient to contact an upper surface of said pull link and displace said pull link from alignment between said leg portions of said clevis type draw bar to release said load binder.

4. The load binder assembly of claim 1 wherein said maximum lobe swell contacts an upper surface of said pull link and displaces said pull link from alignment between said leg portions of said clevis type draw bar sufficient to release said load binder when the lever handle is angled greater than about 60 degrees from the tension plane.

5. The assembly of claim 4 wherein said lever is angled greater than about 80 degrees from the tension plane.

6. The assembly of claim 1 wherein said crank member comprises a pair of parallel, spaced apart, panel elements, structurally connected by bridge elements.

7. The assembly of claim 6 wherein a bridge element comprises a leverage point for the lever handle in tensioning.

8. The assembly of claim 6 comprising a bridge element which engages said cam surface as the assembly is positioned in an over center locked position.

9. The assembly of claim 6 wherein said cam surface contacts an upper surface of said pull link when the assembly is in an over center locked position.

10. The assembly of claim 1 wherein said pull link is configured at a first end to receive a pivot pin.

11. The assembly of claim 10 wherein said pull link is configured at its other end with a ball and socket from which extends an eyelet or hook.

12. The assembly of claim 1 wherein said leg elements of said draw bar are configured to receive pivot pins.

13. The assembly of claim 12 wherein said draw bar is configured at one end with a ball and socket from which extends an eyelet or hook.

14. The assembly of claim 1 wherein an area of maximum lobe swell of said cam surface is positioned at an end of the lever handle least distant from the point of pivotal connection.

15. An over center load binder assembly, comprising a crank member, a clevis type draw bar with leg elements pivotally connected to a first portion of the crank member, a pull link pivotally connected to a second portion of the crank member, and a lever handle, pivotally connected to the crank member and comprising a cam surface radial to the axis of the lever handle pivotal connection, said surface having a maximum lobe swell sufficient to contact an upper surface of said pull link and displace and pull link from an alignment between the leg portions of the clevis type draw bar to release the assembly from tension.

16. An over center load binder assembly comprising a crank member, a draw bar pivotally connected to said crank member, a pull link pivotally connected to said crank member and a lever handle pivotally connected to said crank member for movement in opposite directions for moving said assembly over center between load locking and release conditions, said lever handle having a cam surface arranged to engage said pull link during movement of said lever handle in a first of said directions for moving said assembly from said load locking position over center towards said release position.

17. The assembly of claim 16 wherein said lower handle engages said crank member during movement in a second of said directions for moving said assembly from said release condition over center toward said locking position.

18. The assembly of claim 17, wherein said crank member includes first and second elements, the limit of pivotal movement in said first of said direction is defined by simultaneous engagement of said lever handle with said draw bar and said first element, said level handle engages with said second element during movement in said second of said directions for moving said assembly from said release condition over center towards said load locking position, and the limit of pivotal movement in said second of said directions is defined by simultaneous engagement of said second element with said pull link and said lever handle.

19. The assembly of claim 18, wherein said crank member comprises a pair of parallel panel elements connected by said first and second elements, said pull link and said lever handle including said cam surface are disposed sidewise between said panel elements and said draw bar is a clevis having a leg portion and said crank member is disposed sidewise between and pivotally connected to said leg portions.

* * * * *